(12) United States Patent
Takai (10) Patent No.: US 8,500,469 B2
(45) Date of Patent: Aug. 6, 2013

(54) IC CARD CONNECTOR (75) Inventor: Yosuke Takai, Sakura (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 175 days.

(21) Appl. No.: 13/056,945

(22) PCT Filed: Jul. 8, 2010

(86) PCT No.: PCT/JP2010/004447
§ 371 (c)(1),
(2), (4) Date: Jan. 31, 2011

(87) PCT Pub. No.: WO2011/016180
PCT Pub. Date: Feb. 10, 2011

(65) Prior Publication Data
US 2012/0108091 A1    May 3, 2012

(30) Foreign Application Priority Data

Aug. 4, 2009    (JP) ................. 2009-181635

(51) Int. Cl.
*H01R 13/62* (2006.01)
(52) U.S. Cl.
USPC .......................................... 439/159; 439/631
(58) Field of Classification Search
USPC .................... 439/159, 156, 630, 631
See application file for complete search history.

(56) References Cited

U.S. PATENT DOCUMENTS

| | | | |
|---|---|---|---|
| 3,980,167 A | 9/1976 | Tamura et al. | |
| 4,404,464 A | 9/1983 | Moreno | |
| 4,421,372 A | 12/1983 | Golden | |
| 4,722,693 A | 2/1988 | Rose | |
| 5,035,633 A | 7/1991 | Kobayashi et al. | |
| 5,179,504 A | 1/1993 | Kitahara | |
| 5,207,598 A | 5/1993 | Yamada et al. | |
| 5,300,763 A | 4/1994 | Ito et al. | |
| 5,490,791 A | 2/1996 | Yamada et al. | |
| 5,563,397 A | 10/1996 | Fujimoto et al. | |
| 5,876,218 A | 3/1999 | Liebenow et al. | |
| 6,056,573 A | 5/2000 | Nishioka | |
| 6,068,365 A | 5/2000 | Nagoshi et al. | |
| 6,068,500 A | 5/2000 | Kantner | |
| 6,089,919 A | 7/2000 | Nishioka | |
| 6,109,940 A | 8/2000 | Chad et al. | |
| 6,123,557 A | 9/2000 | Wang et al. | |
| 6,129,571 A | 10/2000 | Ikemoto | |
| 6,129,572 A | 10/2000 | Feldman et al. | |

(Continued)

FOREIGN PATENT DOCUMENTS

| | | |
|---|---|---|
| DE | 1033491 | 7/1958 |
| DE | 3 937 383 A1 | 6/1990 |

(Continued)

OTHER PUBLICATIONS

European Search Report dated May 30, 2012 from the European Patent Office for corresponding European Patent Application No. 10806182.1 (6 pgs).

(Continued)

*Primary Examiner* — Hien Vu
(74) *Attorney, Agent, or Firm* — Finnegan, Henderson, Farabow, Garrett & Dunner, LLP (57) ABSTRACT

In a card accommodation portion, an upper section (14U) provided with contact terminals (16*ai*) electrically connected to an SD card (SDC) detachably attached and a lower section (14D) provided with contact terminals (18*ai*) electrically connected to an HG-Duo card (22) or a Duo card (23) detachably attached are formed in a stacked manner.

5 Claims, 8 Drawing Sheets

U.S. PATENT DOCUMENTS

| | | | |
|---|---|---|---|
| 6,135,809 A | 10/2000 | Asakawa | |
| 6,186,401 B1 | 2/2001 | Magana | |
| 6,203,378 B1 | 3/2001 | Shobara et al. | |
| 6,231,360 B1 | 5/2001 | Horie | |
| 6,234,845 B1 | 5/2001 | Hakozaki | |
| 6,345,760 B1 | 2/2002 | Eason et al. | |
| 6,361,369 B1 | 3/2002 | Kondo et al. | |
| 6,386,920 B1 | 5/2002 | Sun | |
| 6,399,906 B1 | 6/2002 | Sato et al. | |
| 6,402,529 B2 | 6/2002 | Saito et al. | |
| 6,413,108 B2 | 7/2002 | Centefonte | |
| 6,457,647 B1 | 10/2002 | Kurihashi et al. | |
| 6,468,101 B2 | 10/2002 | Suzuki | |
| 6,482,029 B2 | 11/2002 | Nishimura | |
| 6,503,092 B1 | 1/2003 | Sato | |
| 6,508,402 B1 | 1/2003 | Takada et al. | |
| 6,511,350 B1 | 1/2003 | Ito et al. | |
| 6,524,137 B1 | 2/2003 | Liu et al. | |
| 6,527,590 B2 | 3/2003 | Oguchi | |
| 6,547,601 B2 | 4/2003 | Oguchi | |
| 6,601,766 B2 | 8/2003 | Nakagawa et al. | |
| 6,607,404 B1 | 8/2003 | Ito et al. | |
| 6,607,405 B2 | 8/2003 | Nishimura | |
| 6,612,492 B1 | 9/2003 | Yen | |
| 6,641,413 B2 | 11/2003 | Kuroda | |
| 6,655,973 B2 | 12/2003 | Ji et al. | |
| 6,666,724 B1 | 12/2003 | Lwee | |
| 6,699,053 B2 * | 3/2004 | Kuroda | 439/218 |
| 6,699,061 B2 | 3/2004 | Abe et al. | |
| 6,700,788 B2 | 3/2004 | Matsushita et al. | |
| 6,716,066 B1 | 4/2004 | Kuo | |
| 6,749,450 B1 | 6/2004 | Chen | |
| 6,780,062 B2 | 8/2004 | Liu et al. | |
| 6,783,399 B2 | 8/2004 | Joung | |
| 6,863,571 B2 | 3/2005 | Sato et al. | |
| 6,913,492 B2 | 7/2005 | Kuroda et al. | |
| 6,976,870 B1 | 12/2005 | Li | |
| 6,976,879 B2 | 12/2005 | Shishikura et al. | |
| 7,083,442 B2 | 8/2006 | Muramatsu et al. | |
| 7,090,519 B2 | 8/2006 | Muramatsu et al. | |
| 7,118,397 B1 | 10/2006 | Su et al. | |
| 7,182,645 B2 | 2/2007 | Shimizu et al. | |
| 7,326,085 B2 | 2/2008 | Takai et al. | |
| 7,381,069 B2 | 6/2008 | Saito et al. | |
| 7,438,598 B1 | 10/2008 | Ito et al. | |
| 7,661,971 B1 | 2/2010 | Abe | |
| 7,878,826 B2 * | 2/2011 | Kikuchi | 439/159 |
| 2002/0048980 A1 | 4/2002 | Kodama et al. | |
| 2003/0157839 A1 | 8/2003 | Yamaguchi et al. | |
| 2004/0026507 A1 | 2/2004 | Nagata et al. | |
| 2004/0106326 A1 | 6/2004 | Hsieh | |
| 2004/0110423 A1 | 6/2004 | Shishikura et al. | |
| 2005/0162834 A1 | 7/2005 | Nishimura | |
| 2006/0057892 A1 | 3/2006 | Bricaud et al. | |
| 2006/0263570 A1 | 11/2006 | Bunyan | |
| 2007/0134965 A1 * | 6/2007 | Takai et al. | 439/260 |
| 2009/0068868 A1 * | 3/2009 | Ting | 439/159 |
| 2009/0191762 A1 * | 7/2009 | Yamaguchi | 439/631 |
| 2010/0022136 A1 | 1/2010 | Kikuchi | |

FOREIGN PATENT DOCUMENTS

| | | |
|---|---|---|
| DE | 4 139 482 | 6/1993 |
| EP | 0 284 431 A2 | 9/1988 |
| EP | 0 696 008 | 2/1996 |
| EP | 0 936 705 A2 | 8/1999 |
| EP | 0 939 582 A2 | 9/1999 |
| EP | 1 146 474 | 10/2001 |
| EP | 1 246 312 A2 | 10/2002 |
| EP | 1 324 256 | 7/2003 |
| EP | 1 487 001 | 12/2004 |
| JP | 63-133473 | 6/1988 |
| JP | 07-335321 | 12/1995 |
| JP | 10-021348 | 1/1998 |
| JP | 10-091729 | 4/1998 |
| JP | 2784346 | 5/1998 |
| JP | 10-187896 | 7/1998 |
| JP | 10-289754 | 10/1998 |
| JP | 11-316110 | 11/1999 |
| JP | 2000-040562 | 2/2000 |
| JP | 2000-277200 | 6/2000 |
| JP | 2000-251024 | 9/2000 |
| JP | 2000-251025 | 9/2000 |
| JP | 2000-260524 | 9/2000 |
| JP | 2001-135385 | 5/2001 |
| JP | 2001-195546 | 7/2001 |
| JP | 2001-237027 | 8/2001 |
| JP | 2002-050434 | 2/2002 |
| JP | 2002-157056 | 5/2002 |
| JP | 2002-164124 | 6/2002 |
| JP | 2002-174532 | 6/2002 |
| JP | 2002-270261 | 9/2002 |
| JP | 2002-289280 | 10/2002 |
| JP | 2002-289295 | 10/2002 |
| JP | 2002-289299 | 10/2002 |
| JP | 2002-343498 | 11/2002 |
| JP | 3396457 B2 | 2/2003 |
| JP | 2003-288962 | 10/2003 |
| JP | 2003-317858 | 11/2003 |
| JP | 2004-071257 | 3/2004 |
| JP | 2004-095234 | 3/2004 |
| JP | 2004-193111 | 7/2004 |
| JP | 2004-206963 | 7/2004 |
| JP | 2004-214119 | 7/2004 |
| JP | 2004-311123 | 11/2004 |
| JP | 2005-011666 | 1/2005 |
| JP | 2005-44595 | 2/2005 |
| JP | 2005-044780 | 2/2005 |
| JP | 2005-135696 | 5/2005 |
| JP | 2005-519452 | 6/2005 |
| JP | 2005-520296 | 7/2005 |
| JP | 2005-222437 | 8/2005 |
| JP | 2005-222537 | 8/2005 |
| JP | 2005-242946 | 9/2005 |
| JP | 2005-243434 | 9/2005 |
| JP | 2005-285522 | 10/2005 |
| JP | 2005-322498 | 11/2005 |
| JP | 2006-108118 | 4/2006 |
| JP | 2006-520073 | 8/2006 |
| JP | 2007-026854 | 2/2007 |
| JP | 2007-080580 | 3/2007 |
| JP | 3132340 | 5/2007 |
| JP | 2007-157356 | 6/2007 |
| JP | 2007-323944 | 12/2007 |
| JP | 2007-323945 | 12/2007 |

OTHER PUBLICATIONS

First Notice Informing the Applicant of the Communication of the International Application (Form PCT/IB/308) mailed Mar. 10, 2011 for PCT/JP2010/004447 filed Jul. 8, 2010. (2 pgs).

Notification of Transmittal of Translation of the International Preliminary Report on Patentability (Form PCT/IB/338) mailed Mar. 22, 2011 for PCT/JP2010/004447 filed Jul. 8, 2010. (2 pgs.).

Notification Concerning Transmittal of International Preliminary Report on Patentability (Form PCT/IB/326) mailed Feb. 16, 2012 for PCT/JP2010/004447 filed Jul. 8, 2010. (3 pgs).

CN 2520582Y.

European Patent Office Search Report dated Mar. 1, 2004, for European Patent Application No. 00971781.0.

International search Report Application No. PCT/JP00/007762, dated Feb. 6, 2001 from the European Patent Office.

Office Action dated Feb. 19, 2008 for Japanese Patent Application No. 2004-016394.

Office Action dated Jul. 18, 2008 issued in Japanese Application No. 2005-106769.

Office Action dated Apr. 12, 2006 issued in Korean Patent Application No. 10-2004-0085621 and English Translation.

Office Action dated Jun. 6, 2008 in Chinese Patent Application No. 200610067036.7.

Official Action from Japanese Patent Office for Application No. 2003-385753, mailed Jun. 14, 2005.

Official Letter for Japanese Patent Application No. 2004-058232, issued Apr. 19, 2007 (with translation).

* cited by examiner

FIG.12B

IC CARD CONNECTOR

TECHNICAL FIELD

The present invention relates to an IC (integrated circuit) card connector comprising a combined card accommodation portion.

BACKGROUND ART

Generally, the functionalities of electronic devices are extended variously by attaching IC cards such as SD (secure digital) cards and MEMORY STICK DUO (trademark) cards to the electronic devices through IC card connectors. In order to allow multiple IC cards of different shapes to be inserted and used in one electronic device, IC card connectors having a card slot common to the IC cards and a combined card accommodation portion which the IC cards are selectively detachable and attachable on a one-by-one basis, has been proposed for example, as shown in Patent Literature 1.

In such an IC card connector including the combined card accommodation portion, card accommodation portion are formed to extend in a direction in which the IC cards are attached or detached and are hierarchically formed each other while partially overlapping each other. For example, as shown in FIGS. 33 to 35 of Patent Literature 1, the card accommodation portions are separated by a partition which is pressed down by a card guide when an SD card is mounted. A part of each card accommodation portion is individually provided with a group of contact terminals corresponding to contact pads of each IC card. Soldered fixed terminals of the contact terminals in each contact terminal group are press-fitted into and supported by a common rear wall forming the card accommodation portion. Moreover, the contact terminals have their respective contact portions to come into contact with the contact pads of each IC card when the IC card is mounted to the combined card accommodation portion, and the contact portions all extend in the same direction toward the common card slot.

Furthermore, for example, as shown in a relationship between a MEMORY STICK PRO DUO (trademark) card and a MEMORY STICK PRO-HG DUO (trademark) card, in case that a plurality of IC cards different from each other in data transfer rates, some of IC cards have the same outer dimensions but are equipped with electrode pads in different arrangements among them. Even the IC cards in the above case may be sometimes required to be mounted to a common card accommodation portion in a common card connector.

CITATION LIST

Patent Literature

Patent literature 1: Japanese Patent Laid-open No. 2004-206963

SUMMARY OF INVENTION

Suppose a case of configuring the above-described combined card accommodation portion such that a MEMORY STICK PRO Duo (trademark) card and a MEMORY STICK PRO-HG Duo (trademark) card, for example, can be selectively mounted to one of the common accommodation portions. In this case, the card accommodation portion formed below the partition as described above needs to be provided therein with contact terminals essential for both the MEMORY STICK PRO Duo (trademark) and MEMORY STICK PRO-HG Duo (trademark) cards in common as well as contact terminals essential only for the MEMORY STICK PRO-HG Duo (trademark) card.

In this case, also, when the above-described SD card is mounted, the partition pressed down by the card guide comes into contact with the contact portions of the contact terminals essential only for the MEMORY STICK PRO-HG Duo (trademark) card.

Hereby, the partition is raised by the contact terminals in contact with the partition, whereby the contact terminals for SD card might fail to obtain proper contact force at their contact portions or the contact terminals for MEMORY STICK card or the partition might be deformed.

Moreover, if notches, holes, and the like allowing the contact portions of the contact terminals to be selectively inserted therein when the partition is pressed down are formed in the partition for the purpose of preventing the contact portions of the contact terminals from coming into contact with the pressed down partition, the strength of the partition could be impaired. As a result, when a MEMORY STICK PRO Duo (trademark) card or a MEMORY STICK PRO-HG Duo (trademark) card is mounted, the deformation of the partition due to the strength poverty might be not able to obtain the contact force being properly produced at the contact portions of the contact terminals for MEMORY STICK card.

In view of the above-described problem, the present invention aims to provide an IC card connector having a combined card accommodation portion. The IC card connector can accommodate IC cards having the same outer dimensions but having different arrangements of electrode pads in a common card accommodation portion and provide electric connection between an electronic device and an IC card mounted in the IC card connector with proper contact force at the contact portions of the contact terminals.

To achieve the above-described object, the IC card connector according to the present invention comprises an IC card accommodation portion having an upper section configured to detachably/attachably accommodate a first IC card therein; and a lower section formed below the upper section via a partition member forming a bottom of the upper section and configured to detachably/attachably accommodate a second IC card therein, the second IC card being either of two types of IC cards having data transfer rates different from each other and having a plurality of electrode pads arranged in a layout different from that of electrode pads of the first IC card, and arranged at same distance common to the two types of IC cards; a first contact terminal group provided in the upper section and configured to be electrically connected to the electrode pads of the first IC card; and a second contact terminal group provided in the lower section and configured to be electrically connected to the electrode pads of the second IC card, wherein when the first IC card or the second IC card is mounted in the upper section or the lower section of the IC card accommodation portion, end portions of the first and second IC cards which are exposed from an end of the IC card accommodation portion have a generally same length each other.

According to the IC card connector of the present invention, the IC card accommodation portion has an upper section configured to detachably/attachably accommodate a first IC card therein, and a lower section formed below the upper section across a partition member forming a bottom of the upper section and configured to detachably/attachably accommodate a second IC card therein, the second IC card being either of two types of IC cards having data transfer rates different from each other and having multiple electrode pads arranged in a layout different from that of electrode pads of the first IC card, and arranged at the same distance common to the two types of IC cards. When the first IC card or the second IC card is mounted in the upper section or the lower section of the IC card accommodation portion, end portions of the first and second IC cards which are exposed from an end of the IC card accommodation portion have the generally same length. Accordingly, the IC cards having the same outer dimensions but different arrangements of electrode pads can be accommodated in the common card accommodation portion. Moreover, the partition member forms the bottom of the upper section and therefore does not move when the first and second cards are attached or detached. Accordingly, the IC card mounted in the IC card connector can be electrically connected to the electronic device by proper contact force at the contact portions of the contact terminals.

DESCRIPTION OF EMBODIMENTS

Figure 2:
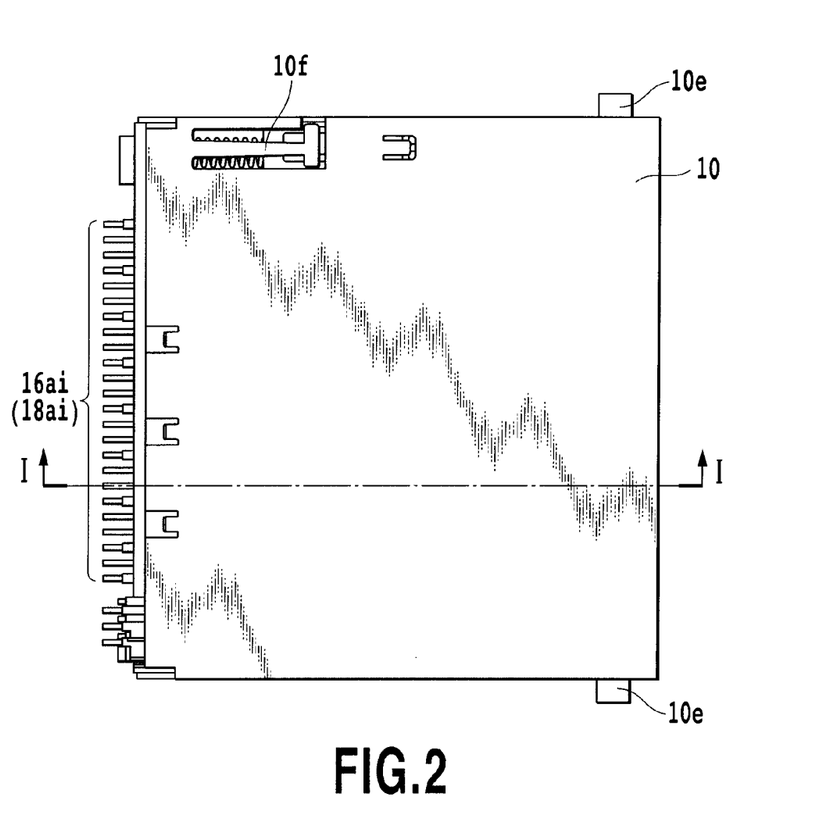
FIG. 2 is a plan view showing an appearance of the example of the IC card connector according to the present invention.

FIG. 2 shows an appearance of an example of an IC card connector according to the present invention.

The IC card connector shown in FIG. 2 is provided within a predetermined electronic equipment, for example, a mobile phone, a PDA, or a camera, or the like.

The IC card connector shown in FIG. 2 is configured to electrically connect an electrode of one of, for example, memory cards as IC cards to be detachably/attachably accommodated in a card accommodation portion of the IC card connector to a connection terminal portion of a board PB which is for input and output of signals or the like and is provided within the predetermined electronic device, the memory cards being, for example, an SD CARD (secure digital card) (trademark) SDC (see FIG. 8) as a first IC card and a MEMORY STICK PRO-HG DUO (trademark) card 22 (see FIG. 12A) as a second IC card. Note that, instead of the MEMORY STICK PRO-HG DUO (trademark) card (hereinafter, also referred to as an HG-Duo card 22), it is possible to mount detachably/attachably, for example, a memory card referred to as a MEMORY STICK PRO-DUO (trademark) card (hereinafter, referred to as a Duo card 23) (see FIG. 12B) which has the same outer dimensions as those of the MEMORY STICK PRO-HG DUO (trademark) card.

It should be noted that the IC card is not limited to the aforementioned SD card and may be selected from MMC (multimedia card) CARDs (trademark), flash memories, memory cards incorporating microdrive, and the like.

The SD card SDC has a thickness of about 2.1 mm and is about 32 mm and about 24 mm in length and width, respectively, for example. The longitudinal and width dimensions of the HG-Duo card 22 are smaller than the longitudinal and width dimensions of the SD card SDC.

Figure 12A:
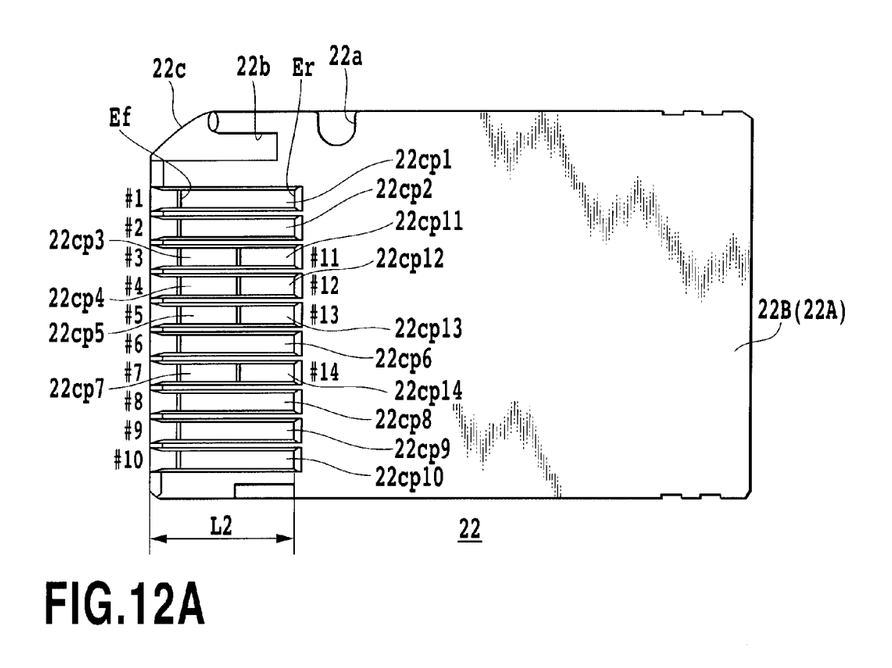
FIG. 12A is a plan view showing HG-Duo card used in the example shown in FIG. 2.

The plate-shaped HG-Duo card 22 includes a front face 22A and a back face 22B opposite to each other, for example, as shown in FIG. 12A. Note that FIG. 12A shows only the back face 22B of the HG-Duo card 22. Moreover, the HG-Duo card 22 has a chamfer portion 22c at a corner of the tip.

In the back face 22B of the HG-Duo card 22, a comparatively shallow recess portion 22b is formed adjacent to the chamfer portion 22c. There is a protrusion of a predetermined length formed along a side surface of the HG-Duo card 22 around the recess portion 22b.

Moreover, a run-out portion 22a is provided at a predetermined distance away from the protrusion in the side surface of the HG-Duo card 22. The run-out portion 22a is thinner than the other part.

In the front end of the back face 22B of the HG-Duo card 22, multiple recesses are formed substantially in parallel to the long side of the HG-Duo card 22 at predetermined intervals away from the recess portion 22b toward the center of the HG-Duo card 22. Each of recess is configured to set the same width and the same length in the longitudinal direction of the HG-Duo card 22. The recesses adjacent to each other are comparted by partition walls, and between the recess located at an end of the row of the recesses and the recess portion 22b are comparted by a partition wall.

In FIG. 12A, a contact pad 22cp1 (#1) as an electrode is provided on the bottom surface of the first recess closest to the recess portion 22b. On the bottom surface of the second recess adjacent to the first recess, a contact pad 22cp2 (#2) of the same length as the contact pad 22cp1 is provided. On the bottom surface of the third recess, divided contact pads 22cp3 (#3) and 22cp11 (#11) are arranged in a line with a predetermined gap therebetween. On the bottom surface of the fifth recess, divided contact pads 22cp5 (#5) and 22cp13 (#13) are arranged in a line with a predetermined gap therebetween. On the bottom surface of the sixth recess, a contact pad 22cp6 (#6) of the same length as the contact pad 22cp1 is provided. On the bottom surface of the seventh recess, divided contact pads 22cp7 (#7) and 22cp14 (#14) are arranged in a line with a predetermined gap therebetween. On the bottom surfaces of the eighth to tenth recesses, contact pads 22cp8 (#8), 22cp9 (#9), and 22cp10 (#10) of the same length as the contact pad 22cp1 are provided, respectively. Respective end portions Ef of the contact pads 22cp1 to 22cp10 fronting the front end of the HG-Duo card 22 are arranged in a common straight line parallel to the short side of the HG-Duo card 22. In addition, end portions Er of the contact pads 22cp1, 22cp2, 22cp6, and 22cp8 to 22cp14 fronting the rear end of the HG-Duo card 22 are also arranged in a common straight line parallel to the short side of the HG-Duo card 22.

Figure 4:
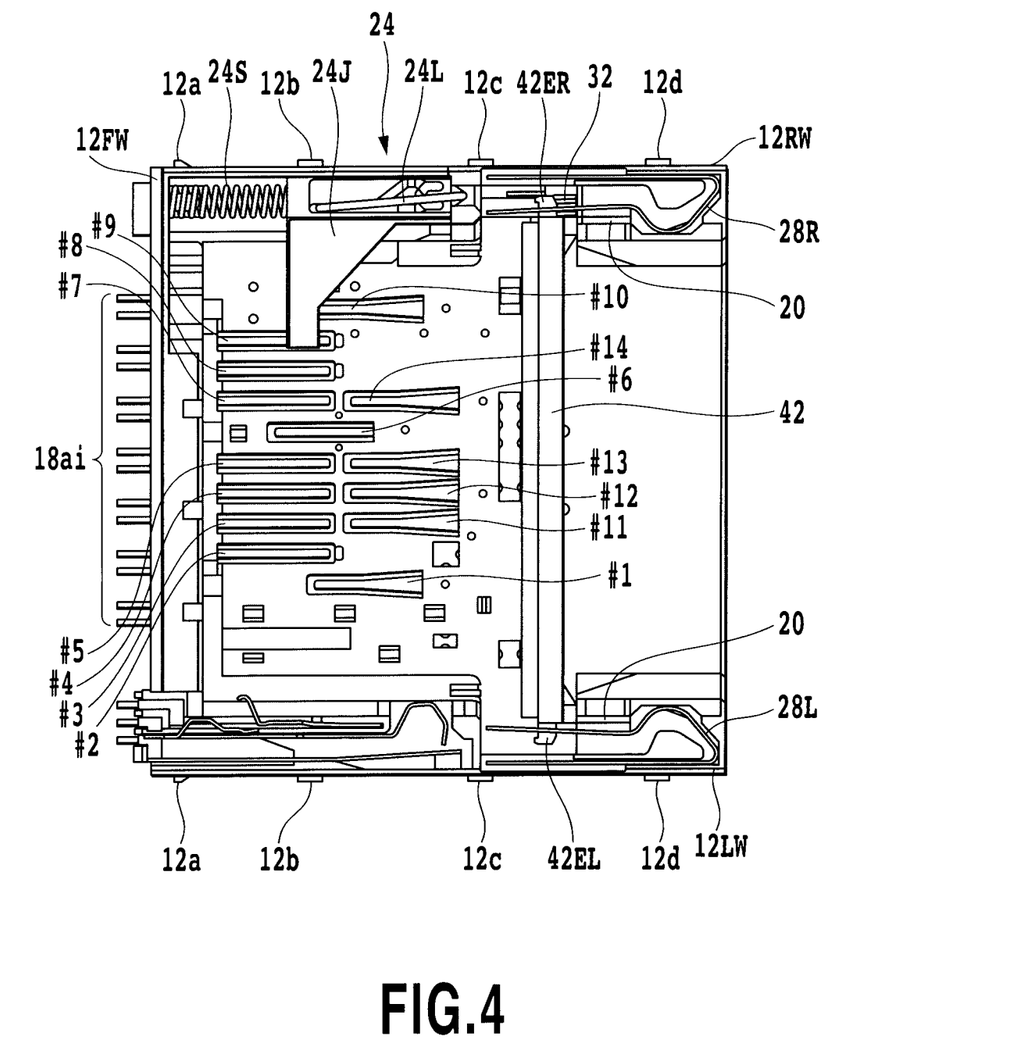
FIG. 4 is a plan view showing an example shown in FIG. 2 with a cover member, a partition, and the like removed.
Figure 12B:
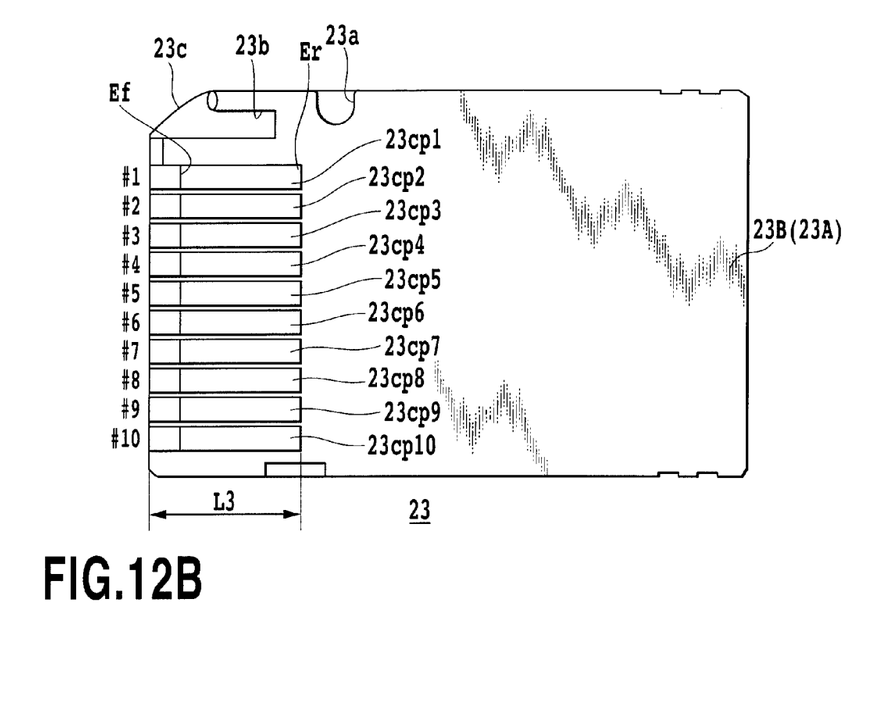
FIG. 12B is a plan view showing Duo cards used in the example shown in FIG. 2.

In FIGS. 4, 12A, and 12B, reference numerals #1 to #14 are expediently given for convenience to describe the correspondent relationship between the contact pads of the IC card and a plurality of contact terminals 18ai (see FIG. 4).

The plate-shaped Duo card 23 has a front face 23A and a back face 23B opposite to each other, for example, as enlarged in FIG. 12B. Note that FIG. 12B shows only the back face 23B of the Duo card 23. Moreover, the Duo card 23 has a chamfer portion 23c at a corner of the tip.

In the back face 23B of the Duo card 23, a comparatively shallow recess portion 23b is formed adjacent to the chamfer portion 23c. There is a protrusion of a predetermined length formed along a side surface of the Duo card 23 around the recess portion 23b.

Moreover, a run-out portion 23a is provided at a predetermined distance away from the protrusion in the side surface of the Duo card 23. The run-out portion 23a is thinner than the other parts.

In the front end of the back face 23B of the Duo card 23, multiple recesses are formed substantially in parallel to the long side of the Duo card 23 at predetermined intervals away from the recess portion 23b toward the center of the Duo card 23. The recesses are configured to set the same width and the same length in the longitudinal direction of the Duo card 23. The recesses adjacent to each other are comparted by partition walls, and between the recess located at an end of the row of the recesses and the recess portion 23b are comparted by a partition wall.

In FIG. 12B, a contact pad 23cp1 (#1) as an electrode is provided on the bottom surface of the first recess closest to the recess portion 23b. On the bottom surfaces of the second to tenth recesses, contact pads 23cp2 (#2), 23cp3 (#3), 23cp4 (#4), 23cp5 (#5), 23cp6 (#6), 23cp7 (#7), 23cp8 (#8), 23cp9 (#9), and 23cp10 (#10) of the same length as the contact pad 23cp1 are provided, respectively. End portions Ef of the contact pads 23cp1 to 23cp10 fronting the front end of the Duo card 23 and end portions Er thereof fronting the rear end of the Duo card 23 are arranged in respective common straight lines parallel to the short side of the Duo card 23. Note that a distance L3 from a front face of the Duo card 23 to the rear end portions Er of the contact pads 23cp1 to 23cp10 is shorter than a distance L2 from a front face of the High Duo card 22 to the rear end portions of the contact pads 22cp1, 22cp2, 22cp6, and 22cp8 to 22cp14. In other words, the length of the contact pads 23cp1 to 23cp10 of the Duo card 23 is set shorter than the length of the contact pads 22cp1 and 22cp10 of the HG-Duo card 22 as shown in FIGS. 12A and 12B.

Figure 1:
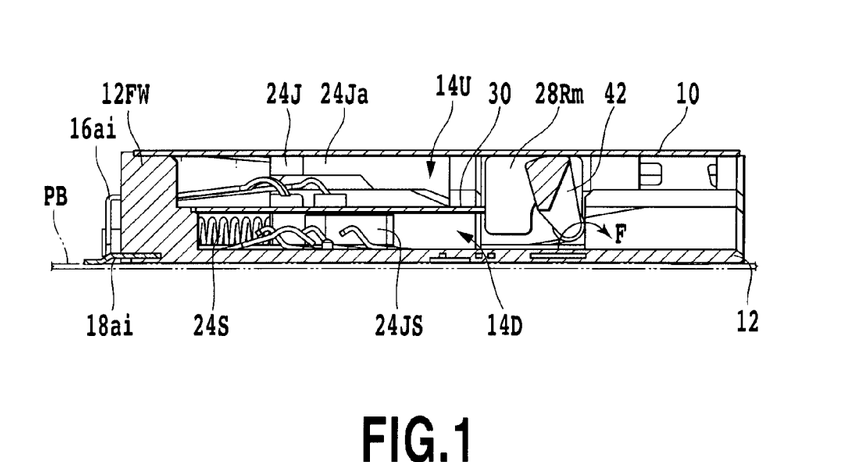
FIG. 1 is a cross-sectional view showing a main portion of an example an IC card connector according to the present invention.

As shown in FIG. 1, the IC card connector comprises a base member 12 in which multiple contact terminals electrically connected to the accommodated SD card SDC, HG-Duo card 22, or Duo card 23 are arranged, and a cover member 10 for forming a combined card accommodation portion for the IC cards in cooperation with the base member 12.

The cover member 10 having a gate-like cross-sectional shape is formed from a sheet metal. In both side surface portions of the cover member 10, engagement holes (not shown) configured to be engaged with nib portions 12a to 12d of the base member 12 shown in FIG. 4 are formed corresponding to the nib portions 12a to 12d. Accordingly, the cover member is fixed to the base member 12 by engaging the engagement holes with the nib portions 12a to 12d of the base member 12.

In addition, as shown in FIG. 2, a leaf spring 10f is provided near one of the both side surface portions of the cover member 10 in the upper surface portion of the cover member 10 connecting the side surface portions. The leaf spring 10f movably supports a cam lever 24L of a later-described eject mechanism 24. A proximal end portion of the leaf spring 10f having resilience is integrally formed with the cover member 10. The leaf spring 10f is formed, for example, by performing press working to stamp out a part of the cover member 10 toward the inside. Accordingly, there is an opening formed around the portion of the cover member 10 corresponding to the leaf spring 10f.

Figure 3:
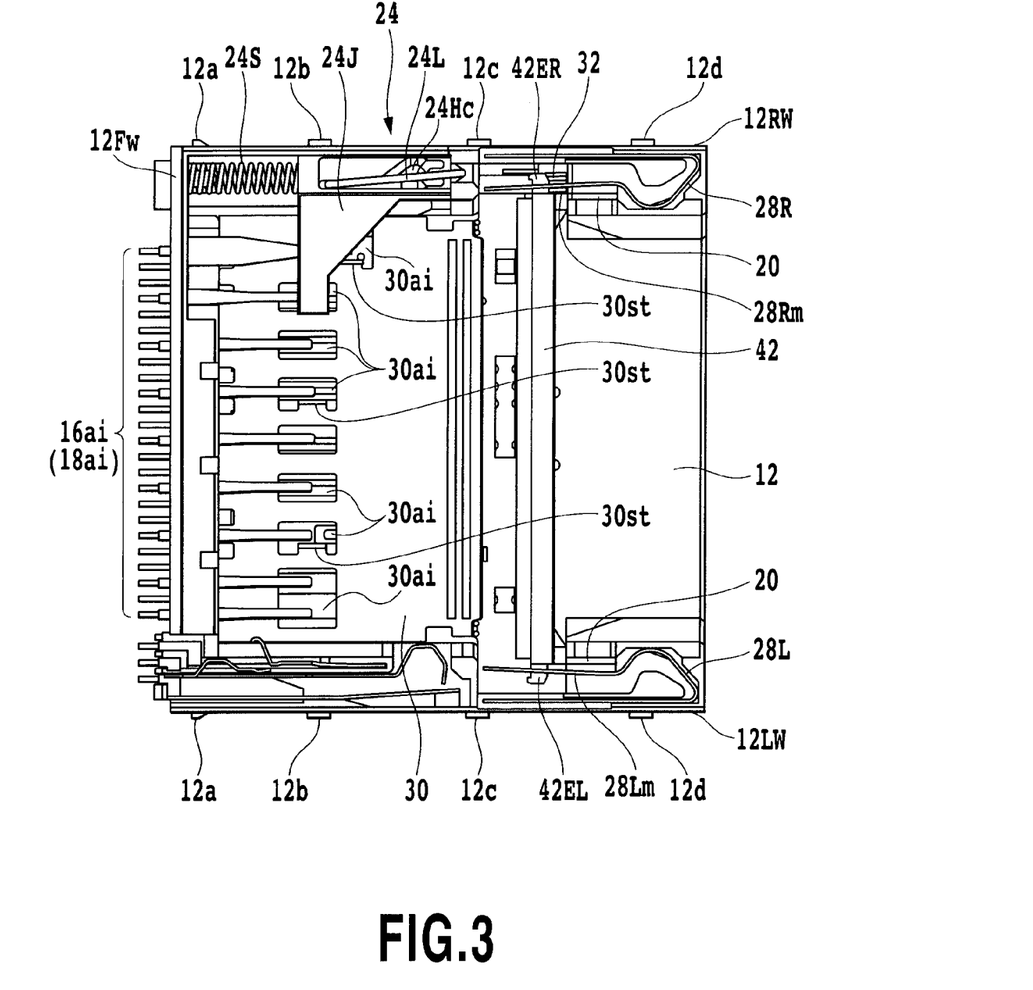
FIG. 3 is a plan view showing an example shown in FIG. 2 with a cover member removed.

As shown in FIGS. 3 and 4, a card accommodation portion of the base member 12 is open at the top and an end opposite to a contact terminal fixed portion. As shown in FIG. 1, the card accommodation portion is a combined card accommodation portion which accommodates the SD card SDC in the upper section 14U and the HG-Duo card 22 or Duo card 23 in the lower section 14D, the upper and lower sections 14U and 14D partially overlapping each other.

Therefore, as shown in FIG. 1, the base member 12 is covered with the aforementioned cover member 10 to form a common card slot in an end portion of the card accommodation portion. The common card slot allows one of the SD card SDC, HG-Duo card 22, and the Duo card 23 to be selectively passed therethrough.

The open end portion as the common card slot has a stepped cross-section corresponding to the shapes of the SD card SDC, HG-Duo card 22 and the Duo card 23 to be inserted, although illustration thereof is omitted.

The open end portion is formed of a first guide portion which has a substantially rectangular cross section and through which the HG-Duo card 22 and the Duo card 23 are passed; a second guide portion which has such a cross section that large and small substantial rectangles are stacked each other and through which the SD card SDC is passed; and paired inclined portions each of which connects an upper end of the first guide portion and a lower end of the second guide portion.

This allows front ends of the SD card SDC and the HG-Duo card 22 and the Duo card 23 in a forward direction to be guided by the second guide portion and the first guide portion and passed toward the upper and lower sections, respectively.

The base member 12 is integrally-molded with a mold resin material, for example. As shown in FIG. 3, the base member 12 comprises sidewalls 12RW and 12LW which individually form both side portions of the card accommodation portion in which the SD card SDC, the HG-Duo card 22, and the Duo card 23 are detachably accommodated; a contact terminal fixing wall 12FW in which contact terminals 18ai (i=1 to 14) for the HG-Duo card 22 and the Duo card 23 and contact terminals 16ai (i=1 to 9) for the SD card SDC are disposed.

As shown in FIG. 3, the nib portions 12a, 12b, 12c, and 12d are formed at predetermined intervals in the outer surface of the sidewall 12LW corresponding to the aforementioned engagement holes of the cover member 10. The similar nib portions 12a, 12b, 12c, and 12d are also formed at predetermined intervals in the outer surface of the sidewall 12RW corresponding to the aforementioned engagement holes of the cover member 10.

For example, as shown in FIG. 3, a plurality of contact terminals 16ai are arranged at predetermined intervals in a portion, of the card accommodation portion, near the contact terminal fixing wall 12FW (the upper section 14U) so as to extend substantially in parallel to the sidewalls 12RW and 12LW.

Figure 9:
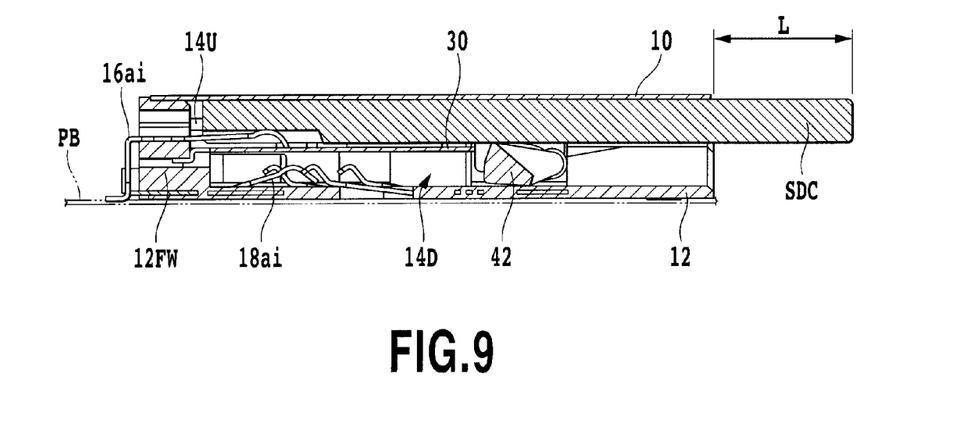
FIG. 9 is a cross-sectional view showing a state shown in FIG. 8.

In contrast, the contact terminals 18ai are arranged at predetermined intervals in a portion of the card accommodation portion, near the contact terminal fixing wall 12FW in the lower section 14D, which is located under the upper section 14U, so as to extend substantially in parallel to the sidewalls 12RW and 12LW. Between the upper section 14U and the lower section 14D are separated by a partition 30 integrally formed with and fixed to the contact terminal fixing wall 12FW as shown in FIGS. 1 and 3. The flat partition 30 is formed substantially in parallel to the bottom surface of the base member 12, and the end thereof on the card slot side extends into a region where a later-described improper insertion restraint member 42 rotates. The partition 30 has slits 30ai (i=1 to 8) (see FIG. 3) into which ends of the contact portions of the contact terminals 16ai are pressed down and inserted when the SD card SDC is inserted are inserted as shown in FIG. 9.

The ends of the contact portions of the contact terminals 16ai are arranged so as not to come into contact with some of the contact terminals 18ai provided under the slits 30ai.

Because the thickness of the partition 30 can be therefore made thin, and the aforementioned structure is effective in downsizing of the connector.

At the peripheries of predetermined ones of the slits 30ai, protrusion pieces 30st for preventing improper insertion are formed so as to protrude toward the cover member 10 by a predetermined height. The protrusion pieces 30st are configured to limit the insertion of the SD card SDC by coming into contact with the end of the SD card SDC inserted in a improper direction. Accordingly, the protrusion pieces 30st prevent so-called reversed insertion or opposite insertion of the SD card SDC.

Each of the contact terminals 16ai comprises: a resilient contact portion which is configured to come into contact with one of the contact pads of the SD card SDC to be electrically connected thereto; a soldered portion which is soldered to the electrode of the wiring board PB to be electrically connected thereto; and a fixed portion which connects the contact portion and the soldered portion and is fixed to the base member 12. The fixed portion of each contact terminal 16ai is made of a sheet metal of metallic material, for example, phosphor bronze for spring. Although not shown in the drawings, the fixed portion of the contact terminal 16ai is fixed to the base member 12 by being press-fitted into a groove formed in the contact terminal fixing wall 12FW through a through-hole formed in the contact terminal fixing wall 12FW in a direction opposite to the inserting direction of the SD card SDC.

Each of the contact terminals 18ai (i=1 to 14) comprises: a resilient contact portion which is configured to come into contact with one of the contact pads of the HG-Duo card 22 and the Duo card 23 to be electrically connected thereto; a soldered portion which is soldered and fixed to the electrode of the aforementioned wiring board to be electrically connected thereto; and a fixed portion which interconnects the contact portion and the soldered portion and is fixed to the base member 12. The contact terminals 18ai are formed by insert molding together with the base member 12. The soldered portions of the contact terminals 18ai protrude from the end of the contact terminal fixing wall 12FW as shown in FIG. 4 and are arranged in a line. The soldered portions of the aforementioned contact terminals 16ai are each disposed between two adjacent contact terminals 18ai and two adjacent contact terminals 18ai as shown FIG. 3.

A first ground line terminal (#10) in the contact terminals 18ai is provided in a bottom portion of the card accommodation portion formed at the closest position to the side wall 12RW. The first ground line terminal (#10) has a contact portion which is configured to come into contact with the contact pad 22cp10 of the HG-Duo card 22 or the contact pad 23cp10 of the Duo card 23 to be electrically connected thereto.

A data transfer line terminal (#14) is adjacent to the first ground line terminal (#10) at a predetermined distance away from the side wall 12RW. The overall length of the data transfer line terminal (#14) is set shorter than the overall length of the first ground line terminal (#10).

In addition, the data transfer line contact terminal (#14) has a contact portion which is configured to come into contact with the contact pad 22cp14 of the HG-Duo card 22 to be electrically connected thereto.

The overall length of a card detection line terminal (#6) adjacent to the data transfer line terminal (#14) is set generally equal to the overall length of a first ground line terminal (#10). However, the card detection line terminal (#6) is located so that the position of the contact portion of the card detection line terminal (#6) is closer to the contact terminal fixing wall 12FW than that of the contact portion of the first ground line terminal (#10). The card detection line terminal (#6) has a contact portion which is configured to come into contact with the contact pad 22cp6 of the HG-Duo card 22 to be electrically connected thereto.

Three data transfer line terminals (#13, #12, and #11) are arranged side by side in adjacent to the card detection line terminal (#6). The three data transfer line terminals have the same structure as each other and have contact portions configured to come into contact with the contact pads 22cp13, 22cp12, and 22cp11 of the HG-Duo card 22 to be electrically connected thereto, respectively. The overall lengths of the data transfer line terminals (#14, #13, #12, and #11) are set to be the same as each other. Accordingly, the positions of the contact portions of the data transfer line terminals (#14, #13, #12, and #11) are set closest to the card slot among the contact portions of all the contact terminals.

Meanwhile, when the Duo card 23 is inserted and held, the data transfer line terminals (#14, #13, #12, and #11) are not used as the contact portions electrically connected thereto. The data transfer line terminals (#14, #13, #12, and #11) are therefore not brought into contact with the contact pads 23cp3 (#3) to 23cp5 (#5) and 23cp7 (#7) of the Duo card 23. The data transfer line terminals (#14, #13, #12, and #11) are not limited to such an example but may be configured to come into contact with the contact pads 23cp3 (#3) to 23cp5 (#5) and 23cp7 (#7) of the Duo card 23, for example.

A second ground line contact terminal (#1) has the same structure as the structure of the aforementioned first ground line terminal (#10) and has a contact portion which is configured to come into contact with the contact pad 22cp1 of the HG-Duo card 22 or the contact pad 23cp1 of the Duo card 23 to be electrically connected thereto.

In the contact terminal fixing wall 12FW, seven contact terminals are provided such that these contact terminals are arranged at predetermined intervals generally in parallel to the sidewalls 12RW and 12LW. The seven contact terminals have the same structure as each other. For example, the power line terminal (#9) most closely adjacent to the first ground line terminal (#10) has a contact portion which is configured to come into contact with the contact pad 22cp9 of the HG-Duo card 22 or the contact pad 23cp9 of the Duo card 23 to be electrically connected thereto.

Other contact terminals (#8 to #2) adjacent to each other in this order include contact portions which are configured to come into contact with the respective contact pads 22cp8, 22cp7, 22cp5, 22cp4, 22cp3, and 22cp2 of the HG-Duo card 22 or the respective contact pads 23cp8, 23cp6, and 23cp2 of the Duo card 23 to be electrically connected thereto.

The overall length of a terminal (#9) is set so that the contact portion of the first ground line terminal 16ai (#10) is placed between the terminal (#9) and the sidewall 12RW so as to overlap the terminal (#9) on the common plane.

The contact terminals (#7, #5, #4, and #3) are arranged on the common lines as the aforementioned data transfer line contact terminals (#14, #13, #12, and #11) so as to be opposed to the same with predetermined gaps therebetween, respectively. As shown in FIG. 4, there are improper insertion preventing walls formed near the contact portions of the contact terminals (#2, #8, and #9) so as to protrude from the bottoms. Each of the improper insertion preventing walls is formed to have a width slightly narrower than those of the contact pads of the aforementioned HG-Duo card 22 and the Duo card 23. Moreover, the improper insertion preventing walls are lower than the heights from the back portion 22B of the HG-Duo card 22 and the back portion 23B of the Duo card 23 and higher than the height positions of the contact portions of the contact terminals (#2, #8, and #9), respectively. Accordingly, if the HG-Duo card 22 and the Duo card 23 are inserted into the card accommodation portion in a improper direction, the improper insertion preventing walls can come into contact with the leading edges of the HG-Duo card 22 and the Duo card 23 to prevent the HG-Duo card 22 and the Duo card 23 from being inserted further. This can prevent the contact terminals from being destroyed by the HG-Duo card 22 and the Duo card 23.

Comparing the terminals (#7, #5, #4, and #3) with the data transfer line terminals (#14, #13, #12, and #11), the data transfer line terminals (#14, #13, #12, and #11) are formed so that the overall length and width thereof are larger than the overall length and the width of the contact terminals, respectively. This allows the contact portions of the contact terminals provided on the common line to be subjected to equal predetermined contact pressure applied by the contact pads of the HG-Duo card 22.

The overall length of the terminal (#2) is set so that the contact portion of the second ground line terminal (#1) is placed between the terminal (#2) and the sidewall 12LW so as to overlap the terminal (#2) on the common plane.

Accordingly, in the lower section 14D of the card accommodation portion, one IC card which is either the HG-Duo card 22 or the Duo card 23 is detachably/attachably loaded.

As shown in FIG. 3, an eject mechanism 24 is provided on the inside of the sidewall 12RW. The eject mechanism 24 is configured to hold one IC card which is the SD card SDC, the HG-Duo card 22, or the Duo card 23 and to selectively eject the one IC card among them from the card accommodation portion.

The eject mechanism 24 comprises an ejector member 24J which is movably supported by the base member 12 and is configured to selectively hold the SD card SDC or the like; a coil spring 24S which is provided between a wall adjacent to the contact terminal fixing wall 12FW of the base member 12 and the ejector member 24J and is configured to urge the ejector member 24J in an ejecting direction of the SD card SDC; and an ejector member controller. The ejector member controller is configured to make a control that selectively holds or releases the ejector member 24J from the base member 12 according to an operation of attaching or detaching the SD card SDC.

Also as shown in Japanese Patent Application Laid-open No. 2004-311416, for example, the ejector member controller comprises a cam element 24HC (heart cam) which is formed in a part of the ejector member 24J on the sidewall 12RW side and has a generally heart shape (see FIG. 5); a lever guide groove 24JG which is formed by multiple step heights formed around the heart cam; and the gate-shaped cam lever 24L (see FIG. 3); and the above-described leaf spring 10f of the cover member 10 (see FIG. 2). One end of the cam lever 24L is connected to a hole of the sidewall 12RW, and the other end of the cam lever is made to slide along the lever guide groove 24JG.

The leaf spring 10f is configured to urge a bent tip of the cam lever 24L so that the bent tip of the cam lever 24L touches and slides on the guide surface of the lever guide groove. An end portion of the cam lever 24L therefore follows the action of the ejector member 24J to be guided sequentially through each guide groove constituting the lever guide groove 24JG. Once the end portion of the cam lever 24L held by the cam surface formed on the heart cam 24HC, the ejector member 24J accompanied with the SD card SDC or the like is thus held in the card accommodation portion. And then, when the end of the cam lever 24L is away from the cam surface by further push-in operation of the SD card SDC or the like, the ejector member 24J accompanied with the SD card SDC or the like is made to move in the card ejecting direction by the urging force of the coil spring 24S.

Figure 5:
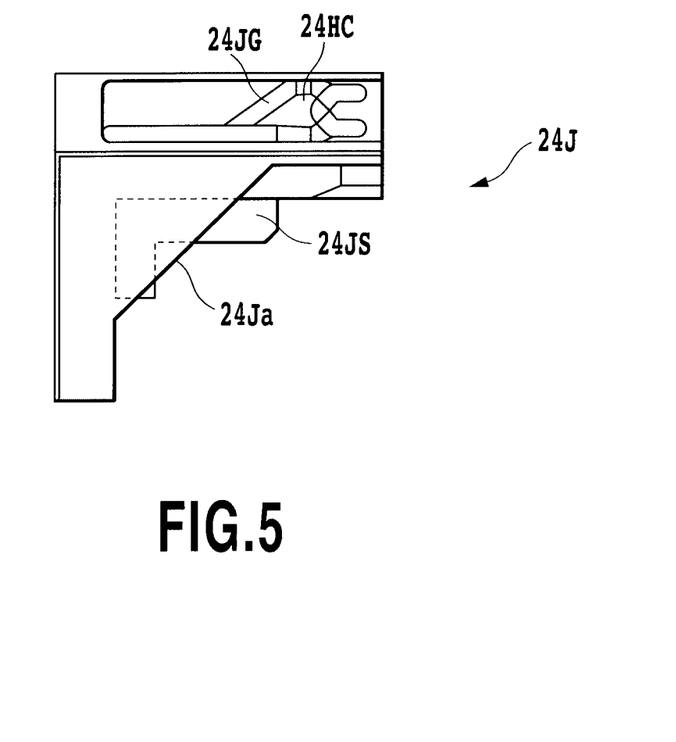
FIG. 5 is a plan view showing an ejector member used in an ejector mechanism in the example shown in FIG. 2.
Figure 6:
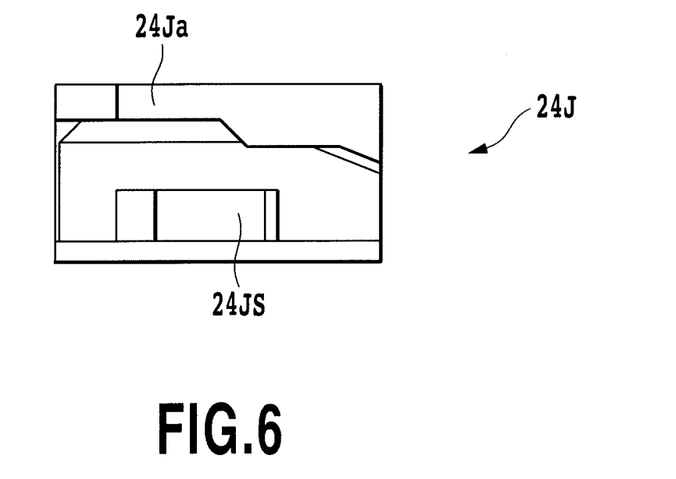
FIG. 6 is a front view of the example shown in FIG. 5.
Figure 7:
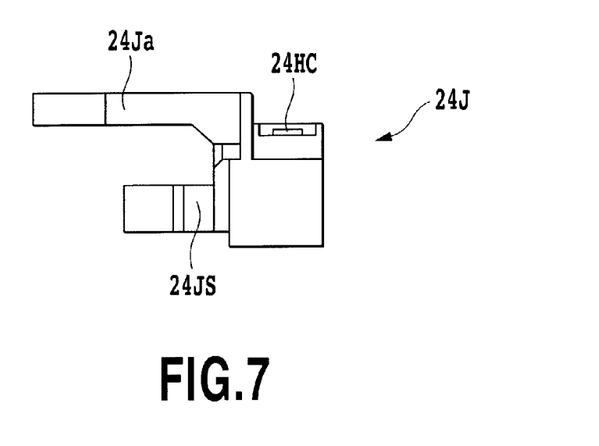
FIG. 7 is a side view of the example shown in FIG. 5.

As shown enlarged in FIGS. 5 to 7, the ejector member 24J has a first card receiving portion 24Ja adjacent to the heart cam 24HC in its upper end portion. The first card receiving portion 24Ja is configured to receive an inclined chamfer portion in the front end portion of the SD card SDC positioned in the upper section 14U in FIG. 1. Under the card receiving portion 24Ja of the ejector member 24, a second card receiving portion 24JS is formed. The second card receiving portion 24JS is configured to receive a corner of the front end portion of the HG-Duo card 22 or the Duo card 23 opposite to the chamfer portion 22c or 23c when the HG-Duo card 22 or the Duo card 23 is positioned in the lower section 14D in FIG. 1.

Furthermore, on the inside of the sidewalls 12RW and 12LW forming a part of the card slot in the card accommodation portion, a card improper insertion preventing mechanism is provided. The card improper insertion preventing mechanism has a structure similar to the structure shown in Japanese Patent Laid-open No. 2007-165011, for example, and comprises a improper insertion restraint member 42, a pair of lock members 28R and 28L for locking or unlocking the improper insertion restraint member 42, and torsion springs 32 for urging the improper insertion restraint member 42 in one direction as shown in FIGS. 3 and 4. The improper insertion restraint member 42 is configured to prevent the improper entry of the HG-Duo card 22 and the Duo card 23 into the contact terminals 16ai by coming into contact with the end of the inserted HG-Duo card 22 and the Duo card 23 in the forward direction.

The improper insertion restraint member 42 formed such as a crank has shaft portions at both ends and a connecting portion interconnecting the shaft portions in the center portion.

The cylindrical shaft portions are rotational movably supported by bearing portions formed within the card accommodation portion in the base member 12. The radial movements of the shaft portions are limited by arc portions of later-described movable pieces 28Rm and 28Lm of the lock members 28R and 28L. The torsion springs 32 are wound around the circumferences of the shaft portions. An end of each of the torsion springs 32 is fixed to an end of the improper insertion restraint member 42, and the other end thereof is fixed to the sidewall of the base member 12. The improper insertion restraint member 42 is therefore urged in a direction indicated by an arrow F in FIG. 1, that is, around the shaft portion in the clockwise direction as the ejecting direction of the SD card SDC.

The aforementioned connecting portion has a touching surface which the inserted SD card SDC or the HG-Duo card 22 and the Duo card 23 touch, at an end in a longitudinal direction thereof. In a portion of the touching surface in the left end, a recess with a predetermined depth and a predetermined inclination (not shown) is formed in the longitudinal direction extending a predetermined length.

At the both ends of the connecting portion interconnecting the shaft portions, notches are individually formed such that the notches are fixed with peripheral edges of openings (not shown) of the later-described movable pieces 28Rm and 28Lm of the lock members 28R and 28L. The notches are formed at the end surface of the aforementioned connecting portion opposed to a touching surface. In other words, hook-like engagement portions 42ER and 42EL configured to be engaged with the peripheral edges of the aforementioned openings of the movable pieces 28Rm and 28Lm are formed at the both ends of the connecting portion.

The paired lock members 28R and 28L have the same structure as each other. Accordingly, a description is given to the lock member 28R, and the description of the lock member 28L is omitted.

The lock member 28R comprises a fixed piece press-fitted into a straight groove formed in the sidewall 12RW of the base member 12 and the movable piece 28Rm integrally formed at an end of the fixed piece.

In a portion of the movable piece 28Rm continuous to an end of the fixed piece, a curvature is formed so as to bulge into the region where a side portion of the SD card SDC passes. Hereby, the distance between the curvature of the lock member 28R and a curvature of the lock member 28L opposite to the lock member 28R is therefore slightly smaller than the width of the SD card SDC and larger than the widths of the HG-Duo card 22 and the Duo card 23.

At an end of the movable piece 28Rm, the rectangular opening (not shown) is formed, into which the engagement portion 42ER of the aforementioned improper insertion restraint member 42 is inserted. There is a predetermined gap between the peripheral edge of the opening portion and the outer circumference of the engagement portion 42ER so that the end of the movable piece 28Rm can move. Moreover, a stopper piece 20 for restraint the initial position of the movable piece 28Rm is provided adjacent to the curvature of the movable piece 28Rm.

Hereby, when the side portions of the SD card SDC pass between the curvatures of the lock members 28R and 28L opposite to each other, the curvatures are pressed by the both side portions of the SD card SDC to separate the opening of the movable piece 28Rm from the engagement portion 42ER of the improper insertion restraint member 42. The lock members 28R and 28L thus unlock the improper insertion restraint member 42.

On the other hand, when the pressed curvatures of the lock members 28R and 28L opposite to each other is changed from the pressed state to a non-pressed state, for example, when the SD card SDC is ejected from the card accommodation portion, the movable piece 28Rm returns to the aforementioned initial position due to the restoring force of the curvature. The aforementioned opening is therefore inserted into the engagement portion 42ER of the improper insertion restraint member 42 urged and rotational moved by the urging force of the torsion spring 32. The lock members 28R and 28L thus lock the improper insertion restraint member 42 again as in the initial state.

In such a structure, when the SD card SDC is mounted in the card accommodation portion, the front end of the SD card SDC going through the card slot presses the curvatures of the lock members 28R and 28L opposite to each other in a separation direction. Accordingly, the openings of the movable pieces 28Rm and 28Lm are separated from the engagement portions 42ER and 42EL of the improper insertion restraint member 42. The improper insertion restraint member 42 is thus unlocked.

Figure 8:
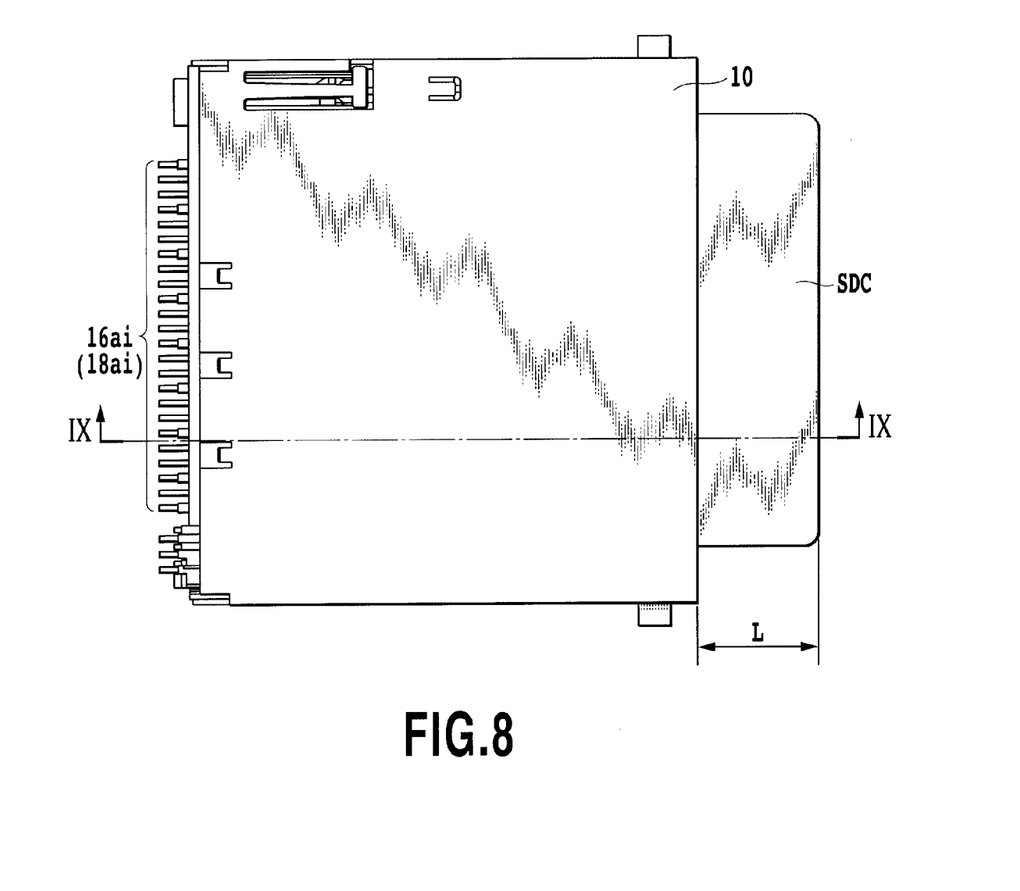
FIG. 8 is a plan view made available for explaining an operation of attaching and detaching an SD card in the example shown in FIG. 2.

Next, if the front end of the SD card SDC is further inserted in the forward direction, the improper insertion restraint member 42 is rotationally moved against the urging force of the torsion springs 32 with the front end of the SD card SDC touching to the touching surface of the improper insertion restraint member 42. Accordingly, the front end of the SD card SDC goes over the improper insertion restraint member 42 and is held at a predetermined position by the ejector member 24J. A rear end of the SD card SDC is therefore protruded from the card slot by a predetermined length L as shown in FIGS. 8 and 9.

On the other hand, when the SD card SDC is taken out from the card accommodation portion, the SD card SDC is slightly further pressed into the card accommodation portion. The SD card SDC is then moved in the eject direction together with the eject member 24J due to the urging force of the coil spring 24S of the eject mechanism.

At that time, the improper insertion restraint member 42 is rotationally moved toward the card slot due to the urging force of the torsion coil springs 32, and the opening of the movable piece 28Rm of the lock member 28R and the opening of the movable piece 28Lm of the lock member 28L which are opposite to each other are returned by the restoring force thereof to the positions facing the engagement portions 42ER and 42EL and are inserted, respectively. The improper insertion restraint member 42 is again returned to the initial locked state.

Figure 10:
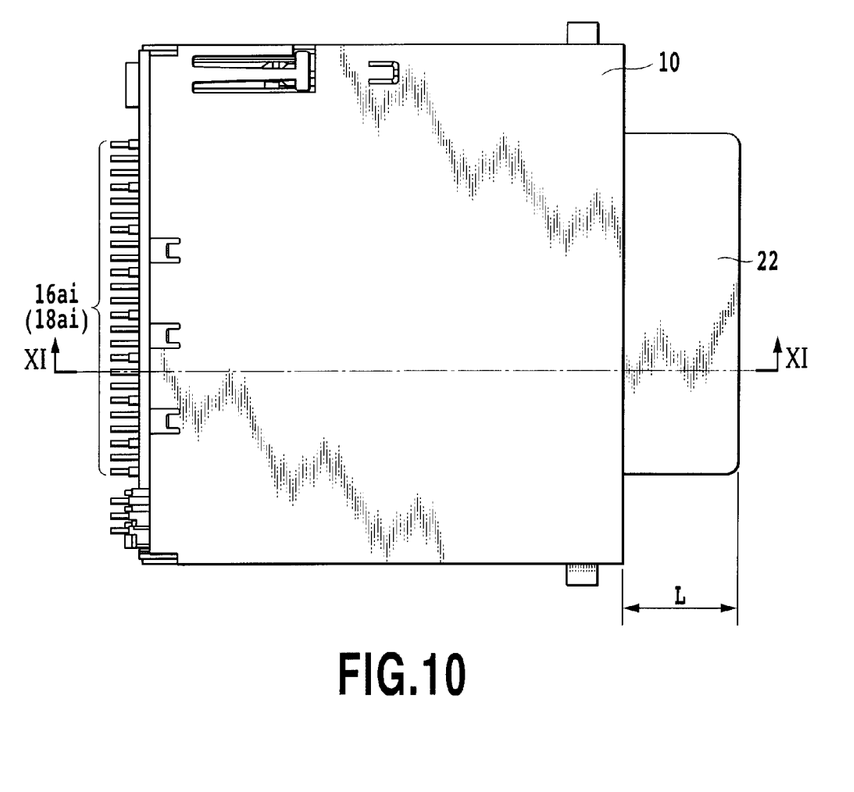
FIG. 10 is a plan view made available for explaining an operation of attaching and detaching an HG-Duo card in the example shown in FIG. 2.
Figure 11:
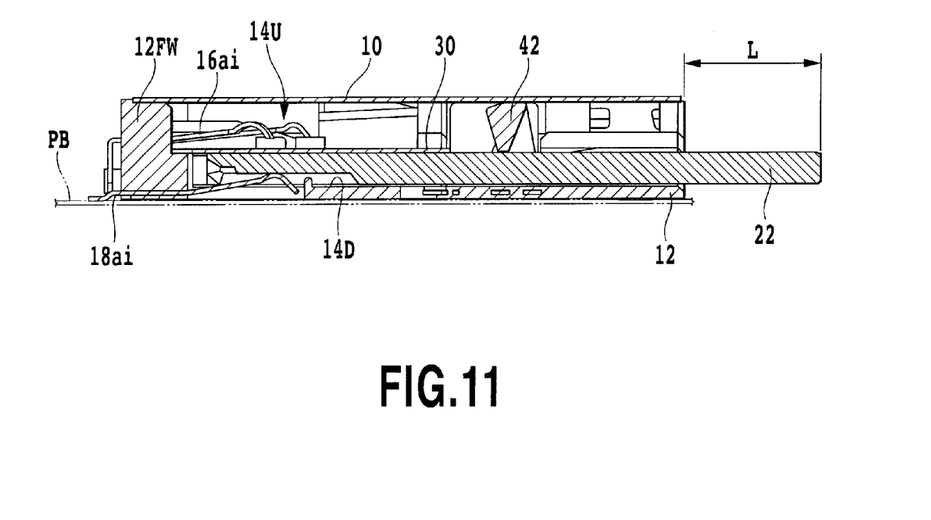
FIG. 11 is a cross-sectional view showing a state shown in FIG. 10.

When either of the HG-Duo card 22 and the Duo card 23 is mounted into a normal position of the card accommodation portion, as shown in FIG. 10, the front end of the inserted HG-Duo card 22 goes through the guide portions of the card slot and then between the curvatures of the lock members 28R and 28L opposite to each other and then goes under the connecting portion of the improper insertion restraint member 42 to be introduced to the lower section 14D as a lower normal position of the card accommodation portion. At that time, the front end of the HG-Duo card 22 is held at a predetermined position by the above described second card receiving portion 24JS. Accordingly, as shown in FIGS. 10 and 11, a rear end of the HG-Duo card 22 is protruded from the card slot by a predetermined length L generally equal to the protruding length L of the aforementioned SD card SDC (see FIG. 8).

In such a case, at the time when the HG-Duo card 22 is inserted into the card accommodation portion through the card slot, the contact pads 22$cp$3, 22$cp$4, 22$cp$5, and 22$cp$7 of the HG-Duo card 22 start to come into slidingly contact with the data transfer line terminals (#11, #12, #13, and #14), respectively. Subsequently, the contact portion of the first ground line terminal (#1) and the contact portion of the second ground line terminal (#10) then come into contact with the contact pads 22$cp$10 and 22$cp$1 of the HG-Duo card 22, respectively.

On the other hand, when the HG-Duo card 22 is taken out from the card accommodation portion, the HG-Duo card 22 is then made to be moved in the eject direction together with the second card receiving portion 24JS due to the urging force of the coil spring 24S of the eject mechanism owing to the HG-Duo card 22 being slightly further pushed into the card accommodation portion.

If the HG-Duo card 22 is accidentally inserted with an end of the card where the contact pads are not formed facing the forward direction, first, the leading edge comes into contact with the touching surface of the improper insertion restraint member 42, and the movable piece 28Lm is therefore separated from the stopper piece 20 and the engagement portion 42EL of the improper insertion restraint member 42, thus unlocking the improper insertion restraint member 42 upon pressing the curvature of the lock member 28L by the left side of the leading edge.

Next, when the touching surface of the unlocked improper insertion restraint member 42 is further pressed against the urging force of the torsion springs 32 by the end portion of the HG-Duo card 22 in the forward direction, the urging force of the torsion springs 32 becomes equal to the restoring force of the movable piece 28Lm, and the improper insertion restraint member 42 is held with the end face of the engagement portion 42EL touched to the movable piece 28Lm. At that time, the engagement portion 42ER of the improper insertion restraint member 42 is rotated so that a part of the notch fit to the peripheral edge of the opening. Accordingly, since the engagement portion 42ER is not unlocked, the improper insertion restraint member 42 prevents the improper insertion of the HG-Duo card 22.

REFERENCE SIGNS LIST

12: BASE MEMBER
14U: UPPER SECTION
14D: LOWER SECTION
16a1, 18ai: CONTACT TERMINALS
22: HG-Duo CARD
23: Duo CARD
24J: EJECTOR MEMBER
30: PARTITION
42: IMPROPER INSERTION RESTRAINT MEMBER

The invention claimed is:

1. An IC card connector system comprising:
a first IC card and an IC card connector,
the first IC card having a front end to be inserted into the IC card connector and a back end that extents outside the IC card connector when properly inserted in the IC card connector,
the IC card connector having:
an accommodation portion having an upper section configured to detachably/attachably accommodate the first IC card therein;
a lower section formed below the upper section via a partition member attached to a front wall of the IC card connector and forming a bottom of the upper section and configured to detachably/attachably accommodate a second IC card therein, the second IC card being different from the first IC card and having a plurality of electrodes arranged in a layout different from that of the electrodes of the first IC card, and arranged at the same distance common to the electrodes of the first IC card;
a first contact terminal group provided in the upper section and configured to be electrically connected to the electrode pads of the first IC card; and
a second contact terminal group provided in the lower section and configured to be electrically connected to the electrode pads of the second IC card, wherein
the partition member has a plurality of slits that are located to permit portions of the first contact terminals to be inserted into the slits upon insertion of the first IC card into the IC card connector and wherein
the partition includes a plurality of protrusions extending into the upper section and positioned adjacent ends of the slits opposite the front wall at least some of the slits to prevent reverse insertion of the first IC card fully into the IC card connector due to the shape of the back end of the first IC card and to permit insertion of the first IC card fully into the IC card connector due to the shape of the front end of the first IC card.

2. The IC card connector according to claim 1, further comprising an improper insertion preventing mechanism having: an improper insertion restraint member rotational movably supported while extending in a direction crossing a direction in which the first and second IC cards are attached to and detached from the card accommodation portion, said improper insertion restraint member being positioned at a first position to guide a leading edge of the first IC card into one direction upon mounting the first IC card in the upper section, said improper insertion restraint member being positioned at a second position to guide a leading edge of the second IC card into another direction upon mounting the second IC card in the lower section; an urging member configured to urge said improper insertion restraint member in a direction in which the IC card is ejected; and a pair of lock members each having a movable piece which is resiliently movable and has an opening to be engaged with an engagement portion formed at two ends of the improper insertion restraint member, said lock members keeping said improper insertion restraint member at the second position selectively when the second IC card is mounted in the lower section.

3. The IC card connector according to claim 2, wherein an end of the partition member on the card slit side of the card accommodation portion is extended into a rotating region of said improper insertion restraint member.

4. The IC card according to claim 1, further comprising: an eject mechanism having an ejector member configured to hold or eject to the outside the first IC card mounted in the upper section of the IC card accommodation portion or the second IC card mounted in the lower section, wherein said ejector member integrally has a first card receiving portion configured to receive the first IC card and a second card receiving portion configured to receive the second IC card corresponding to the upper section and the lower section, respectively.

5. The IC card connector according to claim 1, wherein the second IC card is an HG-Duo card and the second contact terminal group has a contact portion which is configured to come into contact with the contact pad of the HG-Duo card to be electrically connected thereto.

* * * * *